(12) United States Patent
Pawde et al.

(10) Patent No.: US 12,124,491 B1
(45) Date of Patent: Oct. 22, 2024

(54) IDENTIFYING AND CATEGORIZING ADVERSE REMARKS FROM AUDIT REPORTS FOR KNOWLEDGE BASE CREATION AND GENERATING RECOMMENDATIONS

(71) Applicant: Tata Consultancy Services Limited, Mumbai (IN)

(72) Inventors: Aditi Anil Pawde, Pune (IN); Akshada Ananda Shinde, Pune (IN); Manoj Madhav Apte, Pune (IN); Sachin Sharad Pawar, Pune (IN); Sushodhan Sudhir Vaishampayan, Pune (IN); Girish Keshav Palshikar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/462,589

(22) Filed: Sep. 7, 2023

(30) Foreign Application Priority Data

Mar. 29, 2023 (IN) .............................. 202321023187

(51) Int. Cl.
*G06F 16/35* (2019.01)
*G06F 16/335* (2019.01)

(52) U.S. Cl.
CPC .......... *G06F 16/353* (2019.01); *G06F 16/335* (2019.01)

(58) Field of Classification Search
None
See application file for complete search history.

(56) References Cited

U.S. PATENT DOCUMENTS

| 2012/0330971 A1* | 12/2012 | Thomas | G06N 20/00 |
| | | | 707/748 |
| 2020/0004766 A1* | 1/2020 | Li | G06F 40/30 |
| 2021/0117509 A1* | 4/2021 | Aditya | G06F 40/30 |

OTHER PUBLICATIONS

Marina Sokolova; A systematic analysis of performance measures for classification tasks; Elsevier;pp. 427-437 (Year: 2009).*

(Continued)

*Primary Examiner* — Albert M Phillips, III
*Assistant Examiner* — Jermaine A Mincey
(74) *Attorney, Agent, or Firm* — FINNEGAN, HENDERSON, FARABOW, GARRETT & DUNNER LLP

(57) ABSTRACT

Financial audits establish trust in the governance and processes in an organization, but they are time-consuming and knowledge intensive. To increase the effectiveness of financial audit, present disclosure provides system and method that address the task of generating audit recommendations that can help auditors to focus their investigations. Adverse remarks, financial variables mentioned in each sentence are extracted/identified from audit reports and category tag is assigned accordingly, thus creating a knowledge base for generating audit recommendations using a trained sentence classifier. In absence of labeled data, the system applies linguistic rule(s) to identify adverse remark sentences, and automatically create labeled training data for training the sentence classifier. For a given financial statement and financial variables in the audit report that contribute to suspiciousness, the system compares these with the extracted knowledge base and identify aligned adverse remarks that help auditor(s) in focusing on specific directions for further investigations.

20 Claims, 6 Drawing Sheets

(56) References Cited

OTHER PUBLICATIONS

Allen H. Huang et al. "FinBERT: A Large Language Model for Extracting Information from Financial Text," Contemporary Accounting Research, 2022, vol. 40; Issue: 2, Wiley Periodicals LLC, https://onlinelibrary.wiley.com/doi/full/10.1111/1911-3846.12832.

Lars Hillebrand et al. "KPI-BERT: A Joint Named Entity Recognition and Relation Extraction Model for Financial Reports," 26th International Conference on Pattern Recognition (ICPR), 2022, IEEE, https://arxiv.org/pdf/2208.02140v1.pdf.

Lefteris Loukas et al. "FiNER: Financial Numeric Entity Recognition for XBRL Tagging," Proceedings of the 60th Annual Meeting of the Association for Computational Linguistics, 2022, Association for Computational Linguistics, https://aclanthology.org/2022.acl-long.303.pdf.

\* cited by examiner

IDENTIFYING AND CATEGORIZING ADVERSE REMARKS FROM AUDIT REPORTS FOR KNOWLEDGE BASE CREATION AND GENERATING RECOMMENDATIONS

PRIORITY CLAIM

This U.S. patent application claims priority under 35 U.S.C. § 119 to: Indian patent application Ser. No. 20/2321023187, filed on Mar. 29, 2023. The entire contents of the aforementioned application are incorporated herein by reference.

TECHNICAL FIELD

The disclosure herein generally relates to natural language processing (NLP) techniques for generating audit recommendations, and, more particularly, to for systems and methods for identifying and categorizing adverse remarks from audit reports for knowledge base creation and generating recommendations.

BACKGROUND

Financial auditors validate and certify financial statements of an entity (e.g., a company) by collecting various evidence and report any lapses in the form of adverse remarks in audit reports. This is a challenging task and requires knowledgeable and experienced auditors. Financial audits establish trust in the governance and processes in an organization, but these are time-consuming and knowledge intensive as it is evident that knowledge and experience of the auditor play a vital role to carry out an audit efficiently and effectively.

SUMMARY

Embodiments of the present disclosure present technological improvements as solutions to one or more of the above-mentioned technical problems recognized by the inventors in conventional systems.

For example, in one aspect, there is provided a processor implemented method for identifying and categorizing adverse remarks from audit reports for knowledge base creation and generating recommendations. The method comprises receiving, via one or more hardware processors, a corpus of audit reports pertaining to one or more entities; applying, a first set of rules via the one or more hardware processors, on a plurality of sentences comprised in the corpus of audit reports to obtain a set of relevant sentences; labelling, by using a second set of rules via the one or more hardware processors, each sentence amongst the set of relevant sentences to obtain a set of labelled sentences, wherein each sentence in the set of labelled sentences is indicative of (i) an adverse remark-based sentence, (ii) a non-adverse remark-based sentence, and (iii) a sentence with no label; identifying, by using a pre-trained sentence classifier having at least one attention layer via the one or more hardware processors, one or more adverse remarks with an associated explainability in one or more sentences having no label in the set of labelled sentences to obtain a set of adverse remark-based sentences, wherein the at least one attention layer is configured to generate the associated explainability for each of the one or more adverse remarks identified in the set of labelled sentences based on a high-attention weight assigned by the at least one attention layer; applying, a windowing technique having a specific length via the one or more hardware processors, on each adverse remark-based sentence amongst the set of adverse remark-based sentences and performing a comparison of (i) an output of the windowing technique and (ii) a reference category having a pre-defined length to obtain at least one category tag for each adverse remark-based sentence amongst the set of adverse remark-based sentences; and generating, via the one or more hardware processors, a knowledge base based on the at least one category tag for each adverse remark-based sentence amongst the set of adverse remark-based sentences.

In an embodiment, the first set of rules comprises at least one of (i) filtering a sentence not having a verb in the corpus of audit reports, (ii) filtering a sentence having at least one of one or more tables, one or more rows, and one or more columns, and (iii) filtering a sentence having a length less than a pre-defined length.

In an embodiment, the second set of rules comprises at least one of (i) one or more negative verbs without a negation, (ii) one or more positive verbs with the negation, (iii) one or more negative nouns without the negation, (iv) one or more positive nouns with the negation, (v) one or more negative adjectives without a negation, (vi) one or more positive adjectives with the negation, (vii) one or more opinion markers, and (viii) thwarting.

In an embodiment, the comparison of (i) the output of the windowing technique and (ii) the reference category having the pre-defined length is further based on at least one of one or more morphological variations and one or more synonyms of one or more words in each adverse remark-based sentence amongst the set of adverse remark-based sentences.

In an embodiment, the method further comprises obtaining, via the one or more hardware processors, one or more audit reports pertaining to at least one entity; applying, the pre-trained sentence classifier having the at least one attention layer via the one or more hardware processors, on the one or more audit reports to obtain one or more adverse remark-based sentences in the one or more audit reports; generating, via the one or more hardware processors, at least one associated category for each adverse remark-based sentence amongst the one or more adverse remark-based sentences in the one or more audit reports; and generating, by using the generated knowledge base via the one or more hardware processors, one or more audit recommendations based on the at least one associated category tag and the one or more associated adverse remarks for each adverse remark sentence amongst the one or more adverse remarks sentences.

In an embodiment, the method further comprises updating the generated knowledge base based on (i) the at least one associated category tag and the one or more associated adverse remarks for each adverse remark sentence amongst the one or more adverse remarks sentences, wherein the generated knowledge base is updated based on the at least one associated category tag and the one or more associated adverse remarks serving as (i) a new category tag entry, or (ii) a modification to an existing category tag entry in the generated knowledge base.

In an embodiment, the method further comprises receiving, via the one or more hardware processors, an input comprising a category tag; and retrieving, via the one or more hardware processors, a ranked list of one or more adverse remark-based sentences stored in the generated knowledge base based on the category tag.

In another aspect, there is provided a processor implemented system for identifying and categorizing adverse remarks from audit reports for knowledge base creation and generating recommendations. The system comprises: a memory storing instructions; one or more communication interfaces; and one or more hardware processors coupled to the memory via the one or more communication interfaces, wherein the one or more hardware processors are configured by the instructions to: receive a corpus of audit reports pertaining to one or more entities; apply a first set of rules on a plurality of sentences comprised in the corpus of audit reports to obtain a set of relevant sentences; label, by using a second set of rules, each sentence amongst the set of relevant sentences to obtain a set of labelled sentences, wherein each sentence in the set of labelled sentences is indicative of (i) an adverse remark-based sentence, (ii) a non-adverse remark-based sentence, and (iii) a sentence with no label; identify, by using a pre-trained sentence classifier having at least one attention layer, one or more adverse remarks with an associated explainability in one or more sentences having no label in the set of labelled sentences to obtain a set of adverse remark-based sentences, wherein the at least one attention layer is configured to generate the associated explainability for each of the one or more adverse remarks identified in the set of labelled sentences based on a high-attention weight assigned by the at least one attention layer; apply, a windowing technique having a specific length, on each adverse remark-based sentence amongst the set of adverse remark-based sentences and perform a comparison of (i) an output of the windowing technique and (ii) a reference category having a pre-defined length to obtain at least one category tag for each adverse remark-based sentence amongst the set of adverse remark-based sentences; and generate a knowledge base based on the at least one category tag for each adverse remark-based sentence amongst the set of adverse remark-based sentences.

In an embodiment, the first set of rules comprises at least one of (i) filtering a sentence not having a verb in the corpus of audit reports, (ii) filtering a sentence having at least one of one or more tables, one or more rows, and one or more columns, and (iii) filtering a sentence having a length less than a pre-defined length.

In an embodiment, the second set of rules comprises at least one of (i) one or more negative verbs without a negation, (ii) one or more positive verbs with the negation, (iii) one or more negative nouns without the negation, (iv) one or more positive nouns with the negation, (v) one or more negative adjectives without a negation, (vi) one or more positive adjectives with the negation, (vii) one or more opinion markers, and (viii) thwarting.

In an embodiment, the comparison of (i) the output of the windowing technique and (ii) the reference category having the pre-defined length is further based on at least one of one or more morphological variations and one or more synonyms of one or more words in each adverse remark-based sentence amongst the set of adverse remark-based sentences.

In an embodiment, the one or more hardware processors are further configured by the instructions to obtain one or more audit reports pertaining to at least one entity; apply the pre-trained sentence classifier having the at least one attention layer on the one or more audit reports to obtain one or more adverse remark-based sentences in the one or more audit reports; generate at least one associated category tag for each adverse remark-based sentence amongst the one or more adverse remark-based sentences in the one or more audit reports; and generate, by using the generated knowledge base, one or more audit recommendations based on the at least one associated category tag and the one or more associated adverse remarks for each adverse remark sentence amongst the one or more adverse remarks sentences.

In an embodiment, the one or more hardware processors are further configured by the instructions to update the generated knowledge base based on (i) the at least one associated category tag and the one or more associated adverse remarks for each adverse remark sentence amongst the one or more adverse remarks sentences, wherein the generated knowledge base is updated based on the at least one associated category tag and the one or more associated adverse remarks serving as (i) a new category tag entry, or (ii) a modification to an existing category tag entry in the generated knowledge base.

In an embodiment, the one or more hardware processors are further configured by the instructions to receive an input comprising a category tag; and retrieve a ranked list of one or more adverse remark-based sentences stored in the generated knowledge base based on the category tag.

In yet another aspect, there are provided one or more non-transitory machine-readable information storage mediums comprising one or more instructions which when executed by one or more hardware processors cause identifying and categorizing adverse remarks from audit reports for knowledge base creation and generating recommendations by: receiving a corpus of audit reports pertaining to one or more entities; applying, a first set of rules, on a plurality of sentences comprised in the corpus of audit reports to obtain a set of relevant sentences; labelling, by using a second set of rules, each sentence amongst the set of relevant sentences to obtain a set of labelled sentences, wherein each sentence in the set of labelled sentences is indicative of (i) an adverse remark-based sentence, (ii) a non-adverse remark-based sentence, and (iii) a sentence with no label; identifying, by using a pre-trained sentence classifier having at least one attention layer, one or more adverse remarks with an associated explainability in one or more sentences having no label in the set of labelled sentences to obtain a set of adverse remark-based sentences, wherein the at least one attention layer is configured to generate the associated explainability for each of the one or more adverse remarks identified in the set of labelled sentences based on a high-attention weight assigned by the at least one attention layer; applying, a windowing technique having a specific length, on each adverse remark-based sentence amongst the set of adverse remark-based sentences and performing a comparison of (i) an output of the windowing technique and (ii) a reference category having a pre-defined length to obtain at least one category tag for each adverse remark-based sentence amongst the set of adverse remark-based sentences; and generating a knowledge base based on the at least one category tag for each adverse remark-based sentence amongst the set of adverse remark-based sentences.

In an embodiment, the first set of rules comprises at least one of (i) filtering a sentence not having a verb in the corpus of audit reports, (ii) filtering a sentence having at least one of one or more tables, one or more rows, and one or more columns, and (iii) filtering a sentence having a length less than a pre-defined length.

In an embodiment, the second set of rules comprises at least one of (i) one or more negative verbs without a negation, (ii) one or more positive verbs with the negation, (iii) one or more negative nouns without the negation, (iv) one or more positive nouns with the negation, (v) one or more negative adjectives without a negation, (vi) one or more positive adjectives with the negation, (vii) one or more opinion markers, and (viii) thwarting.

In an embodiment, the comparison of (i) the output of the windowing technique and (ii) the reference category having the pre-defined length is further based on at least one of one or more morphological variations and one or more synonyms of one or more words in each adverse remark-based sentence amongst the set of adverse remark-based sentences.

In an embodiment, the one or more instructions which when executed by the one or more hardware processors further cause obtaining one or more audit reports pertaining to at least one entity; applying the pre-trained sentence classifier having the at least one attention layer on the one or more audit reports to obtain one or more adverse remark-based sentences in the one or more audit reports; generating at least one associated category tag for each adverse remark-based sentence amongst the one or more adverse remark-based sentences in the one or more audit reports; and generating, by using the generated knowledge base, one or more audit recommendations based on the at least one associated category tag and the one or more associated adverse remarks for each adverse remark sentence amongst the one or more adverse remarks sentences.

In an embodiment, the one or more instructions which when executed by the one or more hardware processors further cause updating the generated knowledge base based on (i) the at least one associated category tag and the one or more associated adverse remarks for each adverse remark sentence amongst the one or more adverse remarks sentences, wherein the generated knowledge base is updated based on the at least one associated category tag and the one or more associated adverse remarks serving as (i) a new category tag entry, or (ii) a modification to an existing category tag entry in the generated knowledge base.

In an embodiment, the one or more instructions which when executed by the one or more hardware processors further cause receiving an input comprising a category tag; and retrieving a ranked list of one or more adverse remark-based sentences stored in the generated knowledge base based on the category tag.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Financial audit is a complex and knowledge-intensive discipline within accounting for trust-building and ensuring quality of governance in an organization (e.g., refer Arens, Elder, and Beasley 2016), (Nigrini 2020). Financial audit validates internal controls, safeguards the assets, evaluates current and future risks, and provides suggestions for improving governance, ensures processes are followed as required, ensures compliance with standards, guidelines, laws, and regulations, and ensures that the reported financial information is fair and accurate. Stakeholders use audited financial statements (FS), such as balance sheet, income statement, cash-flow statement etc., for decision-making. For example, regulatory bodies use FS to check compliance, tax departments use them to validate taxes paid and benefits claimed, investors use them to estimate the financial health of the company, etc.

A financial auditor is responsible for carrying out financial audit, and in particular for validating and certifying that the financial data mentioned in the FS of a company is fair and accurate. This validation is typically done by collecting evidence from (a) trails of business processes followed in the company (e.g., payment receipts, transaction statements, contractual documents, letters to and from banks, authorities, customers, and suppliers, etc.); as well as from (b) personal inspections (e.g., of warehouses). If the data in FS is consistent with the evidence collected, then the auditor declares in an audit report that the FS are free from material misstatement, fair and accurate and presented in accordance with the relevant accounting standards. If not, the auditor makes adverse remarks about the detected or potential instances of non-conformance, misinformation, irregularities, inconsistencies, errors, inaccuracies, frauds, lapses, non-compliance, violations etc. Adverse remarks often also include auditors' suggestions for improvement. Clearly, knowledge and experience of the auditor play a vital role to carry out an audit efficiently and effectively.

Figure 2:
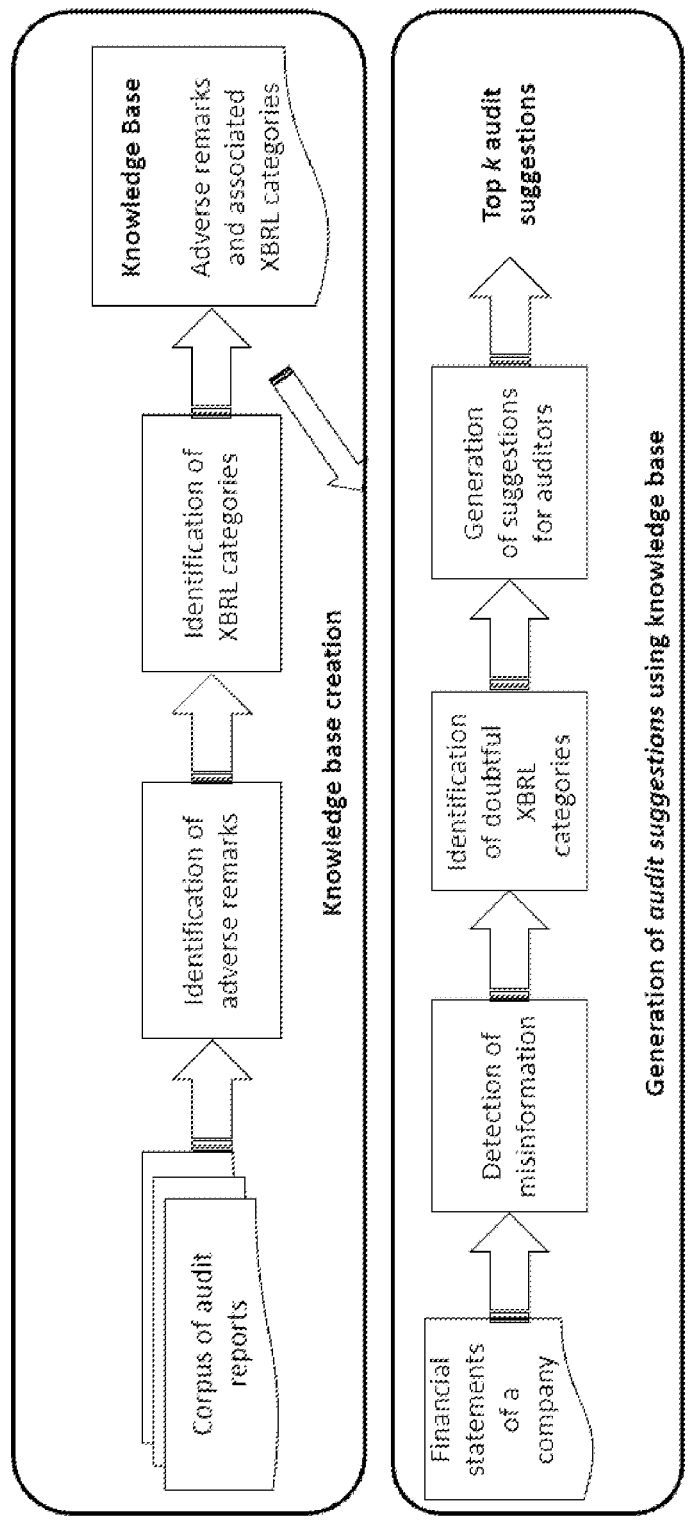
FIG. 2 depicts an exemplary high level block diagram of the system of FIG. 1 for identifying and categorizing adverse remarks from audit reports for knowledge base creation and generating recommendations, in accordance with an embodiment of the present disclosure, in accordance with an embodiment of the present disclosure.

Considering these challenges, the aim of the system and method of the present disclosure is to assist the auditors through an intelligent audit assistance system (FIG. 2). Suppose the system of the present disclosure has a historical corpus D of past FS and associated audit reports for several companies for different years. Say, the system of the present disclosure is also given a FS B for a particular company for a particular year. The system and method of the present disclosure assume that B is already known to be anomalous, and we also assume that we already know an explanation of why B might be anomalous. The task handled in this paper is to identify relevant audit suggestions from D that the auditor can use to guide the progress of the audit process i.e., to explore whether or not the suggested explanations are correct.

Machine Learning (ML) techniques have been used to detect misinformation in FS (refer: (Ashtiani and Raahemi 2021) for a review). While mostly supervised ML techniques (e.g., (Kirkos, Spathis, and Manolopoulos 2007) (Perols 2011)), unsupervised techniques are used to determine whether B (represented as a feature vector of financial variables (FV)) is anomalous with respect to D (Shinde et al. 2022). Informally, a FV refers to something that has a monetary value; each FS is essentially a set of (FV-name, value) pairs. If B is detected as anomalous, the system then uses an explanation generation technique (e.g., (Vaishampayan et al. 2022)) to identify reasons why B is anomalous with respect to D; in particular, the system and method of the present disclosure identify a subset VB of FV in B as the explanation of why B is anomalous. In the present disclosure, the system and method described herein address the task of mining D for providing additional actionable suggestions to the auditor, as to what specifically might/may be wrong with the data in B for VB. Basically, the system and method of the present disclosure identify all adverse remarks in D related to each FV in VB, and suitably pick one or more of these to generate actionable suggestions for the auditor. With this help, auditors can focus on collecting evidence to validate the detected anomalies and explanations generated for them by ML techniques. This helps in reducing efforts and bias in the audit process.

The names and mentions of FV in FS, reports and audit reports are influenced by norms, practices and standards within industries or nations. To facilitate comparison of FS across companies and across years, a taxonomy of standardized classes of FV (called categories) is defined in the extensible Business Reporting Language (XBRL) standard (e.g., refer www.xbrl.org). In the present disclosure, the system and method described herein flatten the XBRL 2010 taxonomy (e.g., refer 'https://www.mca.gov.in/XBRL/pdf/Revised_taxonomy.zip'), and use the resulting 1724 categories ignoring the hierarchical relationships among them (refer FIG. 4). The system and method of the present disclosure ignore/refrain/disregard categories that refer to "Other" kind of financial information, so the number of remaining categories the system considers is 1437.

More specifically, the system and method of the present disclosure focuses on automatically extracting a knowledge base (KB) of actionable knowledge elements from a given corpus AR of past audit reports. Each knowledge element consists of the tuple $(S; v; X_v)$, where S is an adverse remark sentence, v is the text fragment in S which is a mention of a FV in S, $X_v$ is a set of XBRL categories corresponding to v. The system and method of the present disclosure develop techniques for (i) Task A: identifying all adverse remark sentences from AR; and (ii) Task B: Assigning 0, 1 or more XBRL categories to each adverse remark sentence S, along with identifying mentions (if any) of them in S. Usually, an XBRL category matches with a mention of a FV in S. The system and method also demonstrate how this KB could be used to generate audit suggestions/recommendations for a given FS B (already detected as anomalous) and a given set of FV in B (already detected as making B anomalous) (e.g., refer Table 1). More specifically, Table 1 illustrates adverse remarks, mentions of financial variables (bold) in them and associated XBRL categories (subscript).

TABLE 1

During the course of audit, we also noticed that YY bank has issued notice under SARFAESI ACT, on factory building$_{Factory\ Building}$ and current assets$_{Current\ Assets}$ of the company.
The company is carrying P & P Expenses and issue related expenses$_{Share\ Issue\ Expenses}$ of Rs. YY as other current assets$_{Current\ Assets\ Other}$ which in our opinion needs to be write off.
The Company has not deposited amounts of Rs. YY lacs to the Investor Education & Protection Fund against unpaid fixed deposit liabilities including interest thereon$_{Current\ Liabilities}$.
The Company has defaulted in payment of bank loans$_{Current\ Liabilities}$ during the year preceding the previous financial period and continued in this financial year.

Each sentence there can be considered as a potential audit suggestion. For example, if VB includes Long Term Loans and Advances as a FV that makes given B anomalous, then sentence (4) can be mapped to a useful audit suggestion ("check if the company has defaulted on loan payments"), identifiable because this FV and this sentence are both mapped to XBRL category Current Liabilities.

Task A (modeled as a sentence classification problem) is challenging, because adverse remarks are expressed in a large variety of linguistic ways. Also, presence of negation complicates identification of adverse remarks. Identifying XBRL categories that match with a given sentence (Task B) is challenging because a FV is often expressed very differently in text than the standard name of an associated XBRL category. For instance, XBRL category Trade Receivables should match with mentions like recovery of dues, charges recoverable and XBRL category Inventories should match with mentions like warehouse stock, inventory holdings, unsold goods, unused material. Names of XBRL categories often overlap (e.g., taxes payable wealth tax, wealth tax provision, wealth tax receivable) and identifying the correct one among them is tricky. Techniques of the system and method of the present disclosure can also be used to match XBRL categories in sentences which are not adverse remarks, e.g., Hire purchase loans are repayable within one year and shown under Other Current Liabilities. Some adverse remark may not be associated with any XBRL category. For example, Continuing failure to correct major weakness in the internal control system was noticed.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

Figure 1:
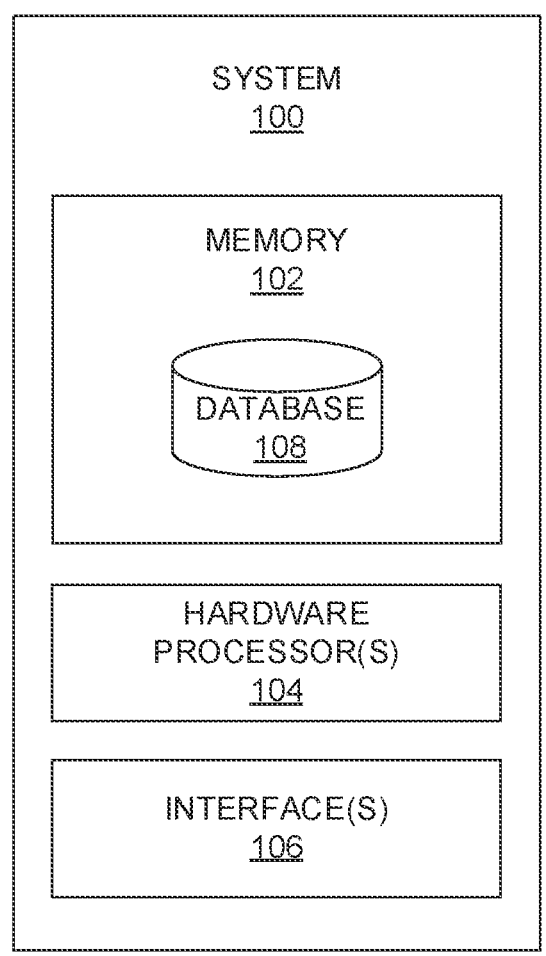
FIG. 1 depicts an exemplary system for identifying and categorizing adverse remarks from audit reports for knowledge base creation and generating recommendations, in accordance with an embodiment of the present disclosure.

FIG. 1 depicts an exemplary system 100 for identifying and categorizing adverse remarks from audit reports for knowledge base creation and generating recommendations, in accordance with an embodiment of the present disclosure. The system 100 may also be referred as 'adverse remarks identification and management system', 'an audit recommendation system', or an adverse remark identification and audit recommendation system' and interchangeably used herein. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises corpus of audit reports pertaining to one or more entities (e.g., organization(s), individual(s), and the like), pre-processed audit reports, relevant sentences obtained after applying a set of rules, labeled sentences obtained from the relevant sentences after applying another set of rules, adverse remark-based sentences identified from various audit reports, explainability against each adverse remark-based sentence, high-attention weight assigned to each adverse remark or adverse remark-based sentence, one or more category tags generated or obtained for each adverse remark-based sentence. The database 108 further comprises knowledge base created using the one or more category tags, the adverse remark-based sentences and the like. The database 108 further comprises one or more morphological variations and one or more synonyms of one or more words in each adverse remark-based sentence, one or more audit recommendations (also referred as recommendations and interchangeably used herein) generated for test audit report (e.g., an incoming audit report), new category tags, modified category tags, and so on. The memory 102 further comprises one or more models such as a sentence classifier, a windowing technique/similarity technique which when executed by the one or more hardware processors perform the method of the present disclosure described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, depicts an exemplary high level block diagram of the system 100 of FIG. 1 for identifying and categorizing adverse remarks from audit reports for knowledge base creation and generating recommendations, in accordance with an embodiment of the present disclosure, in accordance with an embodiment of the present disclosure.

Figure 3:
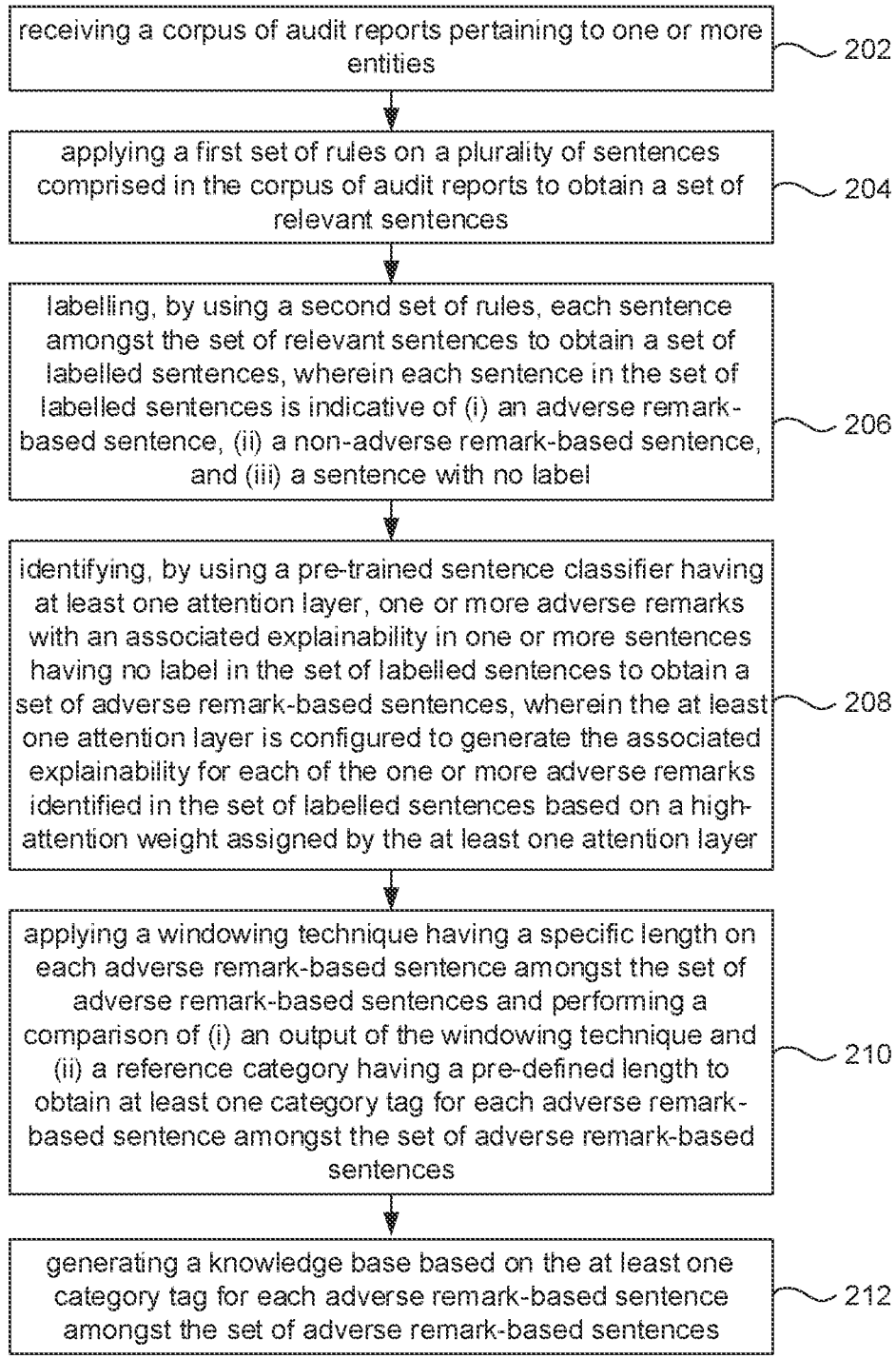
FIG. 3 depicts an exemplary flow chart illustrating a method for identifying and categorizing adverse remarks from audit reports for knowledge base creation and generating recommendations, using the systems of FIGS. 1-2, in accordance with an embodiment of the present disclosure.

FIG. 3, with reference to FIGS. 1-2, depicts an exemplary flow chart illustrating a method for identifying and categorizing adverse remarks from audit reports for knowledge base creation and generating recommendations, using the systems 100 of FIGS. 1-2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIG. 2, and the flow diagram as depicted in FIG. 3.

At step 202 of the method of the present disclosure, the one or more hardware processors 104 receive a corpus of audit reports pertaining to one or more entities. In the present disclosure, the system 100 used web-scraped audit reports made available by authors of (Maka, Pazhanirajan, and Mallapur 2020) as the corpus of audit reports pertaining to one or more entities. The one or more entities may comprise, but are not limited to, organization(s), individual(s), and the like. The system 100 prepared two datasets $D_{14}$, $D_{15}$ for year 2014 (#audit reports: 3759, #sentences: 325486) and 2015 (#audit reports: 3343, #sentences: 241482).

At step 204 of the method of the present disclosure, the one or more hardware processors 104 apply a first set of rules on a plurality of sentences comprised in the corpus of audit reports to obtain a set of relevant sentences. In an embodiment, the first set of rules comprises at least one of (i) filtering a sentence not having a verb in the corpus of audit reports, (ii) filtering a sentence having at least one of one or more tables, one or more rows, and one or more columns, and (iii) filtering a sentence having a length less than a pre-defined length. The number of clean sentences, after removing very short sentences (or sentences having a length less than the pre-defined length), noisy sentences such as tables, rows, columns, and duplicate sentences, is $D_{14}$:106610 and $D_{15}$:71019.

At step 206 of the method of the present disclosure, the one or more hardware processors 104 label, by using a second set of rules, each sentence amongst the set of relevant sentences to obtain a set of labelled sentences, wherein each sentence in the set of labelled sentences is indicative of (i) an adverse remark-based sentence, (ii) a non-adverse remark-based sentence, and (iii) a sentence with no label. In an embodiment, the second set of rules comprises at least one of (i) one or more negative verbs without a negation, (ii) one or more positive verbs with the negation, (iii) one or more negative nouns without the negation, (iv) one or more positive nouns with the negation, (v) one or more negative adjectives without a negation, (vi) one or more positive adjectives with the negation, (vii) one or more opinion markers, and (viii) thwarting. The second set of rules are linguistic rules, in an embodiment of the present disclosure. The above linguistic rules may be better understood by way of following description. Linguistic rules are fairly intuitive and are divided into several categories as depicted in below Table 2.

TABLE 2

| Second set of rules (linguistic rules) | Example verbs/nouns in Rule's Gazette | Example |
|---|---|---|
| R1: Negative verbs without negation | overstate, understate, default, inflate, cheat, neglect, hide, fail, miss, . . . so on. | The Company has defaulted in repayment of dues to the following banks . . . |
| R2: Positive verbs with negation | pay, repay, deposit, provide, receive, charge, . . . so on. | Undisputed statutory dues have not been regularly deposited with authorities. |
| R3: Negative nouns without negation | overstatement, understatement, cheating, negligence, fraud, crime, criminal, delay, . . . so on. | The amount of alleged fraud according to management is Rs. 7, 10, 31, 008/— . . . |
| R4: Positive nouns with negation | payment, repayment, provision, settlement, . . . so on. | The company has not made any provision for depreciation in respect of . . . |
| R5: Negative adjectives without negation | irregular, diverted, undisclosed, unexplained, inoperational, quantifiable, . . . so on. | Utilization of GDR proceeds for undisclosed purposes indicate violations of the FEMA Act |
| R6: Positive adjectives with negation | regular, clear, sufficient, disclosed, ascertained, . . . so on. | The Company has not been regular in depositing undisputed statutory dues. |
| R7: Opinion markers | should have been, yet to, failed to, . . . so on. | Trade discount should have been netted off from Sales. |
| R8: Thwarting | overstate, understate, default, inflate, cheat, neglect, hide, delay . . . | Company was regular in depositing statutory dues, except for TDS where there are delays. |

Rule R1 labels a sentence as adverse remark if the sentence contains a verb with negative sentiment from audit perspective and which is not modified by a negation indicating word (e.g., no, neither) in the dependency tree. R2 identifies a sentence as adverse remark if the sentence contains a verb with positive sentiment but which is modified by a negation indicating word. For R2, the verb should also have its object (dobj or nsubjpass) related to key financial concepts such as tax, debt, dues etc. Rules R3 and R4 (and R5 and R6) are similar rules which check for presence of certain nouns (respectively, adjectives) instead of verbs. In addition to labelling a sentence as adverse remark, the rules also assign NA label (i.e., not adverse remark) if negation is present in case of R1, R3 and R5 and if negation is not present in case of R2, R4 and R6. Rule R7 marks a sentence as adverse remark if certain negative opinion markers' are present. Rule R8 labels a sentence as adverse remark if it contains the word except followed by a clause containing some negative word without any negation (no, not, etc.). Thus, on some sentences the rules would not predict any label.

Once, the set of labelled sentences are obtained which contain (i) an adverse remark-based sentence, (ii) a non-adverse remark-based sentence, and (iii) a sentence with no label, a sentence classifier is trained on the above-mentioned sentence type to obtain a pre-trained sentence classifier. The adverse remark-based sentences, the non-adverse remark-based sentences, and a sentence with no label serve as training data to train the sentence classifier has one or more attention layer(s). The sentence classifier having the one or more attention layer(s) (e.g., also referred as 'sentence classifier with multi-headed attention layer' or $M_{BERT}$ and interchangeably used herein).

At step 208 of the method of the present disclosure, the one or more hardware processors 104 identify, by using the pre-trained sentence classifier having at least one attention layer ($M_{BERT}$), one or more adverse remarks with an associated explainability in one or more sentences having no label in the set of labelled sentences to obtain a set of adverse remark-based sentences. In an embodiment, the at least one attention layer is configured to generate the associated explainability for each of the one or more adverse remarks identified in the set of labelled sentences based on a high-attention weight assigned by the at least one attention layer. The above step of 208 is better understood by way of following description:

Given the training data containing sentences from a corpus labelled (e.g., the set of labelled sentences) using linguistic rules, the system 100 designed the sentence classifier based on Bidirectional Encoder Representations from Transformers (BERT) that uses additional attention layers and keyword-based features for obtaining better sentence representations (which is denote $M_{BERT}$). An input sentence S is first passed through the pre-trained sentence classifier having at least one attention layer to obtain (i) [CLS] token encoding which provides the representation of the entire input text S, and (ii) the representations for each word in S.

$$x_{CLS}, X = BERT(S) \quad (1)$$

Here, $x_{CLS} \in \mathbb{R}^{768}$ and $X \in \mathbb{R}^{L \times 768}$ where $L^3$ is the maximum number of words in any input sentence. Let $X_i \in \mathbb{R}^{768}$ be the representation for the $i^{th}$ word in S. The system 100 uses an attention layer similar to the one in the literature (e.g., refer Basiri et al. 2021) so that the contribution of each word in S is determined based on its importance: $a_i = W_a^T \cdot X_i + b$. Here, $W_a \in \mathbb{R}^{768}$ and $b \in R$ are the weight vector and bias of the attention layer, respectively. $a_i \in \mathbb{R}$ is the score for the $i^{th}$ word as computed by the attention layer. These scores are normalized across all the words in S to obtain final attention weights which are used to obtain a weighted average of word representations.

$$\alpha_i = \frac{\exp(a_i)}{\sum_{j=1}^{L} \exp(a_j)}; \quad (2)$$

$$X_w = \sum_{i=1}^{L} \alpha_i \cdot X_i$$

In addition to the text representation by the pre-trained BERT model (e.g., the $M_{BERT}$), the system 100 is further configured to capture presence of important keywords (e.g., refer Table 1) that may indicate presence of an adverse remark. The presence or absence of each of the K keywords in S is represented by a binary vector $X_{kw} \in \mathbb{R}^K$. Finally, the overall representation of the input sentence is obtained by concatenating it with the representations obtained in equations (1) and (2) as: $X_{final} = [x_{CLS}; X_w; X_{kw}]$. This final representation is then passed through two linear transformation layers to obtain the final output which is a probability distribution over two labels—adverse remark and NA. The BERT model is then trained to minimize the cross-entropy loss.

The system 100 and method of the present disclosure used the following baselines for this classification task: The system 100 trained Random Forest, Logistic Regression, Support Vector Machine with RBF Kernel and XGBoost classifiers on the training dataset DIR created by the second set of rules (e.g., the linguistic rules).

FinBERT: The system 100 used the pre-trained FinBERT (e.g., refer Araci 2019) model as a classifier.

Ensemble: The system 100 created an ensemble of the individual classifiers to improve the classification accuracy as follows. As the linguistic rules are high precision, the system 100 considered predictions of the rules as the final prediction for the sentences where rules are applied (for both adverse remark and NA classes). For the remaining sentences, the system 100 checked for the predictions made by other classifiers. The system 100 considered $M_{BERT}$ predictions as final predictions for remaining sentences except for the following two exception rules. If $M_{BERT}$ predicts NA for a sentence but all other classifiers (RF, LR, SVM RBF and XGBoost) predict adverse remark then its final prediction was changed to adverse remark. If $M_{BERT}$ predicts adverse remark for a sentence but at least two other classifiers do not predict adverse remarks, then its final prediction was changed to NA.

Referring to steps of FIG. 3, at step 210 of the method of the present disclosure, the one or more hardware processors 104 apply, a windowing technique having a specific length, on each adverse remark-based sentence amongst the set of adverse remark-based sentences and perform a comparison of (i) an output of the windowing technique and (ii) a reference category having a pre-defined length to obtain at least one category tag for each adverse remark-based sentence amongst the set of adverse remark-based sentences. In an embodiment, the comparison of (i) the output of the windowing technique and (ii) the reference category having the pre-defined length is further based on at least one of one or more morphological variations and one or more synonyms of one or more words in each adverse remark-based sentence amongst the set of adverse remark-based sentences. For instance, a morphological variation of a term 'asset' may be 'assets'. Similarly, the morphological variation of the terms expense, loss, liability may be expenses, losses, and liabilities respectively. Further, the system 100 also considers various synonyms for words appearing in the identified adverse remark-based sentences. For example, the identified adverse remark-based sentences may include terms/words such as expenditure, equity, liability, and the like for which the system 100 considers synonyms such as expense, stock, and obligation, respectively. The above step of 210 is better understood by way of following description:

The system 100 and method of the present disclosure implemented Jaccard Similarity as the windowing technique, in an embodiment. Jaccard Similarity as the windowing technique is simple, unsupervised, and interpretable technique wherein similarity matching is performed between two sets. For each category (e.g., an extensible Business Reporting Language (XBRL) category) X having |X|=k word in it, the system 100 applies windows of sizes k−1, k, k+1, k+2, and so on and obtains all possible contiguous word subsequences in a given sentence S by sliding these windows. The similarity of the category X with the sentence is the highest Jaccard similarity with any of these subsets. For example, the identified adverse remark-based sentence may be 'Company has not transferred unclaimed share application money of Rs 348323 to investor Education and Protection Fund in accordance with provisions of Companies Act, 1956'. The following steps are carried out by the system 100 to obtain a Jaccard Similarity score.

1. The system 100 applies windowing technique on the above exemplary identified adverse remark-based sentence to identify at least one category tag amongst a plurality of category tags stored in the database 108. Prior to applying the windowing technique, the system 100 is configured with a category tag threshold (e.g., say 0.6, which is reconfigurable depending upon the implementation and requirements) which helps identifying a specific category tag, 2. Each window of the specific length is applied on the adverse remark-based sentence 'Company has not transferred unclaimed share application money of Rs 348323 to investor Education and Protection Fund in accordance with provisions of Companies Act, 1956' and a JS score is computed for each such window, and the window where the system 100 obtains a maximum Jaccard similarity score is considered as the matched window.

3. For a window, say "investor Education and Protection Fund", and category to be matched ('amounts transferred investor education protection fund'), Jaccard Similarity (JS) score was computed by way of following equation:

JS=#words in intersection/#words in union=|{investor, education, protection, fund}|/ |{amount, transfer, investor, education, protection, fund}|=4/6=0.66. Since the category length is 6 words (e.g., amounts transferred investor education protection fund), the windowing technique applied by the system 100 will have lengths as k−1=5, k=6, k+1=7, and k+2=8, respectively.

4. Based on the windowing technique, the JS score and comparison of the computed JS score (0.66) with the category tag threshold (e.g., say 0.6), the system 100 identified 'amounts transferred investor education protection fund' as the identified category tag. It is to be noted that the system 100 had identified 'and' expression from the window "investor Education and Protection Fund", as the stop word and accordingly ignored.

The above steps 1-4 can be referred as 'Matched due to sufficient similarity' scenario. Similarly, for 'Unmatched due to low similarity' scenario and a sentence containing adverse remark such as 'These un-audited branches account for XX percent of advances, XX percent of deposits, XX percent of interest income and XX percent of interest expenses', the following steps may be followed for identifying a category tag and computing the JS score, in a nutshell:
1. Category to be matched: total expenditure
2. Length of category, k: 2
3. Matched window: expenses
4. Size of matched window, k−1:1
5. JS=#words in intersection/#words in union=|{expenses}|/|{total, expenses}|=1/2=0.5 (expenditure and expenses are synonyms of each other).

It is to be understood by a person having ordinary skill in the art or person skilled in the art that the above exemplary scenarios shall not be construed as limiting the scope of the present disclosure.

While computing similarity (or while obtaining the at least one category tag for each adverse remark-based sentence amongst the set of adverse remark-based sentences), the synonyms and morphological variations of a word are taken into consideration by the system 100 and the system 100 ignores one or more stop words. A category (or also referred as 'category tag' and interchangeably used herein) is matched with a sentence if the Jaccard similarity thus computed is above a threshold $\theta_1$ (e.g., the system 100 was configured with $\theta_1$=0.6). The system 100 also experimented/explored other unsupervised matching techniques. For instance, one such technique as known in the art is SBfull which is a baseline technique and based on literature (e.g., Devine and Blincoe 2022). This SBfull technique computes cosine similarity between the Sentence-BERT (Reimers and Gurevych 2019) based embeddings of an XBRL category X and the input sentence S and assigns categories having similarity with S above a threshold $\theta_0$ (e.g., $\theta_0$=0.5).

SBwin: This technique is similar to Jaccard Similarity, except that instead of Jaccard similarity, it uses cosine similarity between the Sentence-BERT embeddings of the subsequence (window) of the input sentence and that of the XBRL category (e.g., threshold $\theta_2$=0.8). To improve performance, categories which match at lower similarity threshold (=0.3) with S in SBfull were only considered in SBwin.

BM25: Okapi BM25 (Robertson and Zaragoza 2009) is a conventional and probabilistic retrieval framework based ranking function that estimates the relevance of documents given a query. The system 100 used a sentence S as a query and all XBRL categories as documents. All sentences and XBRL category names were preprocessed to remove stop words and only lemmatized distinct words from sentences and queries were retained. Relevance score thus obtained was divided by length of the sentence to remove bias due to long sentences. Since there are thousands of XBRL categories, for better efficiency, the system 100 shortlisted only those that have more than p % (e.g., p=50%) overlap with the given sentence. The system 100 considered top 'm' scores for a sentence and retrieved all categories that had relevance score equal to any of these top 'm' scores. (e.g., m=10).

0SHOT-TC: Zero-shot text classification (0SHOT-TC) (Yin, Hay, and Roth 2019) using Natural Language Inference (NLI) assigns a label to a text fragment even without its context such as domain, topic etc. Given a sentence S as premise, the hypothesis This is about [category] is tested for all XBRL categories using pre-trained BARTlargeMNLI model as known in the art. Categories having entailment score above threshold $\theta_3$ were assigned to S ($\theta_3$=0.6).

Figure 4:
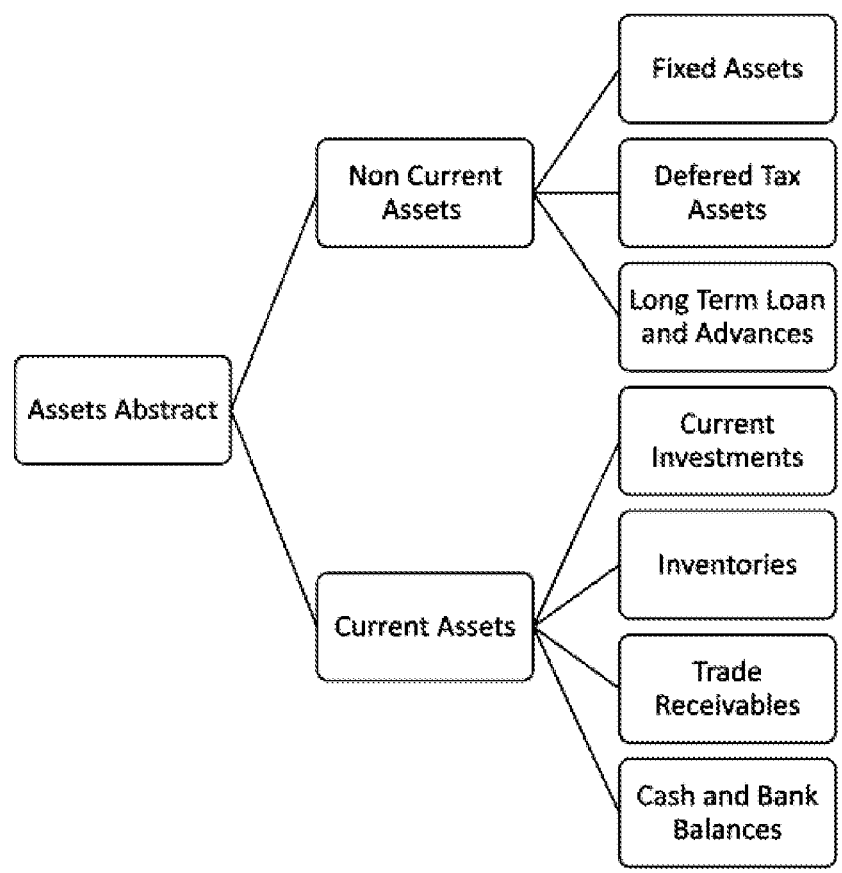
FIG. 4 illustrates an extensible Business Reporting Language (XBRL) category hierarchy as generated/populated by the system using audit reports serving as input, in accordance with an example embodiment of the present disclosure.

Referring to steps of FIG. 3, at step 212 of the method of the present disclosure, the one or more hardware processors 104 generate a knowledge base based on the at least one category tag and one or more associated adverse remarks for each adverse remark-based sentence amongst the set of adverse remark-based sentences. In other words, the knowledge base is created using the at least one category tag generated for each adverse remark-based sentence amongst the set of adverse remark-based sentences. The system 100 may also generate two or more category tags for each adverse remark-based sentence amongst the set of adverse remark-based sentences. In other words, the knowledge base is created by consolidating categories and corresponding adverse remark-based sentences for all the available categories which is output of all the steps (e.g., refer steps 202 through 212). FIG. 4, with reference to FIGS. 1 through 3, depicts an exemplary category hierarchy, in accordance with an example embodiment of the present disclosure. More specifically, FIG. 4 illustrates the extensible Business Reporting Language (XBRL) category hierarchy as generated/populated by the system 100 using audit reports serving as input, in accordance with an example embodiment of the present disclosure. It is to be understood by a person having ordinary skill in the art or person skilled in the art the category hierarchy may vary depending on the implementation of the system and method in various environments and such category hierarchy shall not be construed as limiting the scope of the present disclosure.

Once the knowledge base is created/generated by the system 100, the system 100 may be implemented/deployed in various environments to generate audit recommendations for new audit reports serving as inputs. For instance, say the system 100 receives one or more audit reports pertaining to at least one entity (e.g., say a company A). The step of receiving the one or more audit reports pertaining to at least one entity is similar to the step 202. However, during the audit recommendation generation, the audit reports as mentioned above may be receiving in real-time, or near real-time, and the like, in an embodiment of the present disclosure. There could be other scenarios, where the audit reports of the at least one entity may be received after certain time period. For instance, auditors may have already conducted an audit of the company A, and the audit reports serving as an output of the audit may be received as input by the system 100. The system 100 executes the pre-trained sentence classifier having the at least one attention layer. More specifically, the system 100 applies the pre-trained sentence classifier having the at least one attention layer on the one or more audit reports to obtain/identify one or more adverse remark-based sentences in the one or more audit reports. Once the one or more adverse remark-based sentences are identified from the one or more audit reports, the system 100 generates at least one associated category tag for each adverse remark-based sentence amongst the one or more adverse remark-based sentences in the one or more audit reports. Once the associated category tag is generated by the system 100, the system 100 then generates, by using the generated knowledge base, one or more audit recommendations for each adverse remark sentence amongst the one or more adverse remarks sentences based on the at least one associated category tag. As mentioned above, the audit recommendations are to be generated pre-audit or during an audit. Thus, the use-case where audit reports are used as input and audit recommendations are generated as output, wherein the audit recommendations are useful for future audit reports which can serve as input for performing subsequent auditing of one or more entities.

In other words, the method of present disclosure further includes various other steps wherein the one or more hardware processors are further configured by the instructions to obtain one or more audit reports pertaining to at least one entity. Further, the method applies the pre-trained sentence classifier having the at least one attention layer on the one or more audit reports to obtain/identify one or more adverse remark-based sentences in the one or more audit reports. At least one associated category tag is then generated for each adverse remark-based sentence amongst the one or more adverse remark-based sentences in the one or more audit reports. The method further includes generating one or more audit recommendations based on the at least one associated category tag generated for each adverse remark sentence amongst the one or more adverse remarks sentences.

The method of present disclosure further includes various other steps where the one or more hardware processors are further configured by the instructions to update the generated knowledge base based on (i) the at least one associated category tag and the one or more associated adverse remarks for each adverse remark sentence amongst the one or more adverse remarks sentences. In an embodiment, the generated knowledge base is updated based on the at least one associated category tag and the one or more associated adverse remarks serving as (i) a new category tag entry, or (ii) a modification to an existing category tag entry in the generated knowledge base. For instance, if a new category tag is identified then this category tag is updated in the knowledge base. In another instance, if an existing category tag is modified/corrected based on the training the sentence classifier has undergone, then the knowledge base is updated with the modified category tag. In other words, whenever new corpus of audit reports or new XBRL taxonomy/categories are available, knowledge base is updated by repeating steps for knowledge base creation (refer steps 202 through 212 for knowledge base generation/creation).

The method of present disclosure further includes various other steps where the one or more hardware processors are further configured by the instructions to receive an input comprising a category tag and retrieve a ranked list of one or more adverse remark-based sentences stored in the generated knowledge base based on the category tag. Adverse remark-based sentences for a given category are clustered into k clusters. Clusters are ordered based on cluster size in decreasing order. A representative sentence is chosen from each cluster as audit recommendation, thus outputting 'k' audit recommendations by the system 100.

Experimental Analysis

Input dataset: As mentioned above in step 202, the system 100 used web-scraped audit reports made available by authors of (Maka, Pazhanirajan, and Mallapur 2020) as the corpus of audit reports pertaining to one or more entities. The one or more entities may comprise, but are not limited to, organization(s), individual(s), and the like. The system 100 prepared two datasets $D_{14}$, $D_{15}$ for year 2014 (#audit reports: 3759, #sentences: 325486) and 2015 (#audit reports: 3343, #sentences: 241482). Further, as mentioned above, the number of clean sentences, after removing very short sentences (or sentences having a length less than the pre-defined length), noisy sentences such as tables, rows, columns, and duplicate sentences, is $D_{14}$:106610 and $D_{15}$:71019.

Figure 5A:
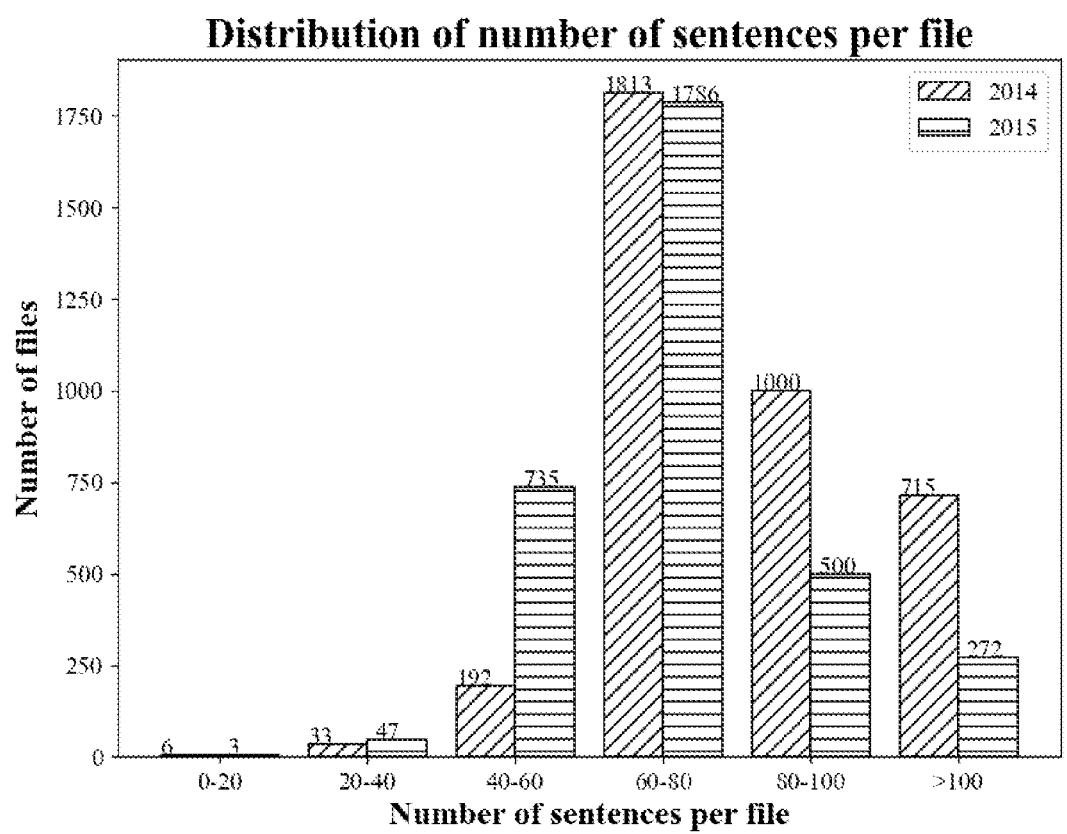
FIGS. 5A and 5B depict a graphical representation illustrating distributions of number of sentences per file and sentence length, in accordance with an embodiment of the present disclosure.
Figure 5B:
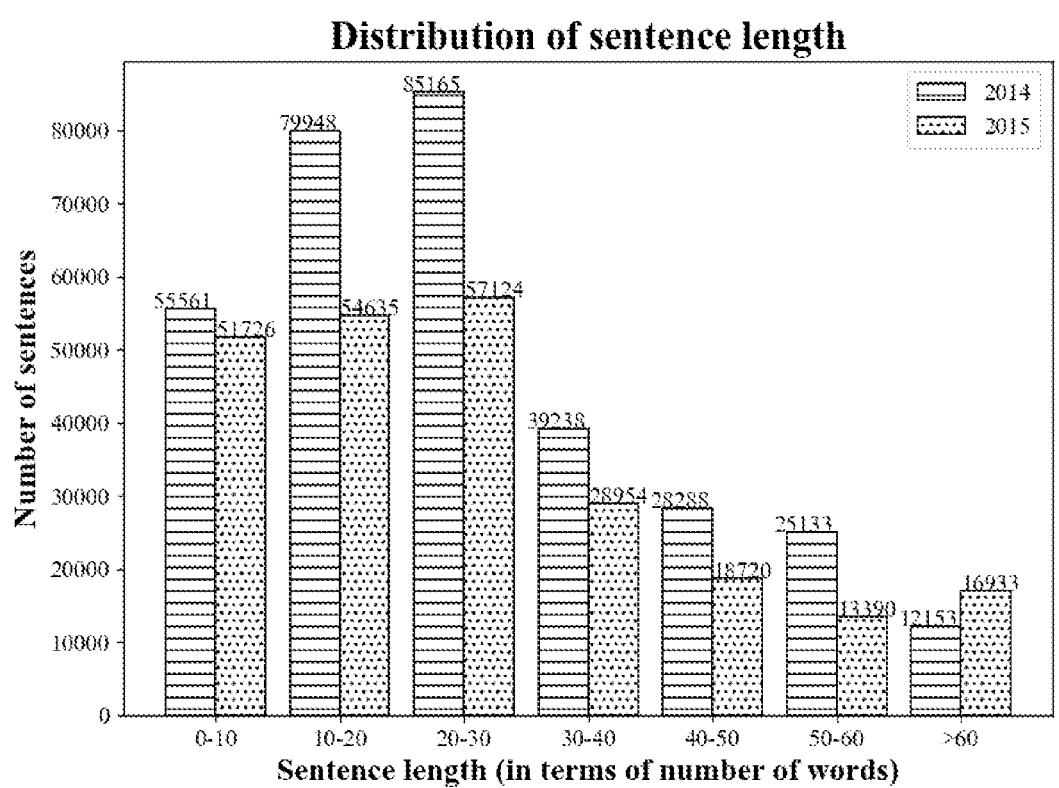

The system 100 applied the second set of rules (also referred as the linguistic rules and interchangeably used herein) on $D_{14}$ to prepare a training set for a sentence classifier. $D_{15}$ was used as an unseen dataset for evaluating the performance of all methods (described in later paragraphs). Summary statistics for number of words per sentence is depicted in FIGS. 5A and 5B, wherein $D_{14}$: average=25.6, stdev=17.1, Q1=13, median: 22, Q3=35; $D_{15}$: average=26.6, stdev=20.8, Q1=11, median: 22, Q3=36. Summary statistics for number of sentences per file: $D_{14}$: average=86.6, stdev=31.1, Q1=69, median: 78, Q3=92; $D_{15}$: average=72.2, stdev=22.1, Q1=60, median: 67, Q3=78. FIGS. 5A and 5B, with reference to, FIGS. 1 through 4, depict a graphical representation illustrating distributions of number of sentences per file and sentence length, in accordance with an embodiment of the present disclosure.

Training dataset was obtained by applying the linguistic rules on $D_{14}$, which labeled 2837 sentences as adverse remark and 9861 as NA (rules did not predict any label for the remaining sentences). The system 100 randomly selected additional 1000 sentences from $D_{14}$ as NA. The baseline classifiers were trained on this automatically created labeled training dataset (denoted $D_{TR}$). Note that (i) no manual efforts were spent in labeling the sentences in $D_{TR}$; and (ii) linguistic rules and FinBERT did not use the training dataset $D_{15}$.

Evaluation dataset ($D_{EV}$) was obtained by removing sentences that did not have a single verb or had length <10 or >50 from the $D_{15}$. Out of the remaining sentences the system 100 randomly selected 500 sentences making sure they are sufficiently different from each other to avoid near-duplicates. The system 100 was configured with detailed annotation guidelines (not shown in FIGS.) using which each sentence was labelled as either adverse_remark or NA. A total of 82 sentences were labeled as adverse remark and the remaining 418 as NA. This dataset is denoted as $D_{EV}$. The basic guideline for marking a sentence as adverse_remark is already mentioned in Introduction. Examples of other guidelines are as follows. (i) A sentence containing mention of an action of the management/state of the company which indicates a problem should be marked adverse (or adverse remark-based sentence). For example, Company is not in a position to meet its financial obligations. (ii) A sentence in which the auditor is only stating facts (without negative opinion) should not be marked as adverse, though the facts may appear negative from a business perspective. Using this, the sentence Company has disclosed the impact of pending litigation in financial statements, should not be marked as adverse_remark, because the auditor is noting that the company had taken a correct action. Kappa statistic for inter-annotator agreement (2 annotators) was $k$ =0:718, which is substantial agreement.

The system 100 performed an evaluation on performance wherein baseline classifiers and $M_{BERT}$ were trained on $D_{TR}$. Then, these classifiers, and other methods mentioned earlier, were applied to predict the labels for the sentences in $D_{EV}$ (e.g., refer below Table 3). More specifically, Table 3 illustrates evaluation of Task A, in an example embodiment of the present disclosure.

TABLE 3

| Method | P | R | $F_1$ |
|---|---|---|---|
| Rules | 0.96 | 0.28 | 0.26 |
| FinBERT | 0.37 | 0.43 | 0.30 |
| Random Forest (RF) | 0.58 | 0.72 | 0.65 |
| Logistic Regression (LS) | 0.39 | 0.76 | 0.51 |
| SVM RBF | 0.46 | 0.84 | 0.6 |
| XGBoost | 0.60 | 0.50 | 0.55 |
| $M_{BERT}$ | 0.68 | 0.74 | 0.71 |
| Ensemble | 0.69 | 0.76 | 0.72 |

The precision of the rules is the highest, even when applied to sentences in $D_{EV}$ drawn from $D_{15}$, which shows that the rules are robust. Classifier such as Support Vector Machine (SVM) had the highest recall, but relatively poor precision. $M_{BERT}$ outperformed other methods in terms of $F_1$ measure, and the simple Ensemble method has the highest overall performance in terms of $F_1$. Many errors of $M_{BERT}$ seem to be because of incorrect learning of attention weights. $M_{BERT}$ wrongly identifies Note 27 describes the uncertainty related to the outcome of the lawsuit filed against the Company. as adverse_remark because it assigns high attention weight to uncertainty and this word has appeared more frequently with adverse remark class in the training dataset. $M_{BERT}$ missed the adverse remark Company has given corporate guarantee in earlier years for loans taken by subsidiary company from a bank. This sentence is adverse because of the domain knowledge giving guarantee for loans by other companies may be risky. Such adverse_remarks are not covered by linguistic rules, so these are absent in $D_{TR}$.

Performance on Task B:

Evaluation Dataset: 0, 1, or more XBRL categories were assigned to each of the 82 adverse remark sentences from $D_{EV}$, since a sentence may contain mentions of many FV. This dataset was denoted as $D_B$. Total of 32 distinct XBRL categories were used in labeling the 82 sentences (average number of XBRL categories per sentence is 1.49). Detailed guidelines have been prepared by the system and method of the present disclosure for this annotation. The suggested approach is to identify mentions of FV in the given sentence, and then assign the "nearest" matching XBRL category for each FV mention. A difficulty arises when multiple XBRL categories have a near match for a given FV mention, in which case annotators need to carefully understand the context of that FV mention from the sentence before assigning the XBRL category. For example, We invite attention to Note no. 29.02 of the financial statements regarding the contingent liability with regard to proceedings under the Income tax Act, 1961 including non-filing of return for the financial year 2013-14. Here FV mentions could be contingent liability and Income Tax. However, Income Tax is part of an act name and should not be labeled. Contingent liability refers to a statutory liability pending to be paid and to be provided for, so the label should be provision statutory liabilities.

Evaluation: Since multiple XBRL categories get predicted for each sentence, micro-average $F_1$ is used as the evaluation metric (e.g., refer Table 4). More specifically, Table 4 illustrates evaluation of Task B.

TABLE 4

|        | All categories |      |       | Top 5 frequent |      |       |
|--------|----------------|------|-------|----------------|------|-------|
| Method | P              | R    | $F_1$ | P              | R    | $F_1$ |
| SBfull | 0.06           | 0.12 | 0.08  | 0.00           | 0.00 | 0.00  |
| JS     | 0.50           | 0.56 | 0.53  | 0.95           | 0.76 | 0.84  |
| SBwin  | 0.30           | 0.18 | 0.23  | 1.00           | 0.16 | 0.28  |
| BM25   | 0.26           | 0.34 | 0.30  | 0.91           | 0.40 | 0.56  |
| 0SHOT-TC | 0.09         | 0.25 | 0.13  | 1.00           | 0.28 | 0.44  |

For a method, for each category X, true positives are those sentences for which X is present in evaluation dataset De as well as in predicted set. Sentences for which X is not present in De but present in predicted set are false positives. Sentences for which X is present in De but absent in predicted set are false negatives. Thresholds $\theta_0$, $\theta_1$, $\theta_2$, and $\theta_3$ have been chosen where highest $F_1$, MicroAvg is seen; 'm' is chosen to get better recall for sentences having many categories. SBfull performs poorly because the encoding obtained by Sentence-BERT is for the entire sentence, with which the embedding of a particular category tends to have low similarity. SBwin performs better because it uses windows over the sentences, rather than the full sentence. 0SHOT-TC (entailment) poorly captured relevance of XBRL category to a given sentence. A common reason for this poor performance is that the language models used for these methods are trained on a different corpus (not financial text) and used here without fine tuning. Jaccard Similarity (JS) as implemented by the system and method of the present disclosure and BM25 perform better for the categories that are likely to be present in audit reports as is, e.g., Fixed Assets, Investments etc. These give false positives where the category name appears but not as a FV, as explained in the earlier example of Income Tax. None of the methods is able to correctly predict categories that require domain knowledge, for example, Shareholders' funds are part of the net worth of a company. If the auditor made an adverse remark for net worth, then the category Shareholders' funds is implied based on this knowledge. Despite all the challenges of diverse mentions of categories, unsupervised nature of detection techniques and unavailability of domain knowledge; except for SBfull, all the methods give high precision for top 5 frequent categories in gold standard viz, Payments income taxes, Taxes payable sales tax, Central excise duty, Shareholders' funds and Profit loss account, and the like.

Generating Audit Suggestions/Recommendations:

Table 5 shows an example balance sheet, which was identified as anomalous by an anomaly detection technique (values are in units of Rupees 10 million). More specifically, Table 5 illustrates an exemplary balance sheet. The explanation generation technique as implemented by the method of the present disclosure identified Total Assets, Fixed Assets (among others) as the FV that make this balance sheet anomalous.

TABLE 5

| Equity Share Capital | 3.12 |
|---|---|
| Preference Share Capital | 4.25 |
| Total Share Capital | 7.37 |
| Reserves and Surplus | −7.36 |
| Total Reserves and Surplus | −7.36 |
| Total Shareholders' Funds | 0.01 |
| Long Term Borrowings | 0.35 |
| Long Term Provisions | 0 |
| Total Non-Current Liabilities | 0.35 |
| Short Term Borrowings | 0.7 |
| Trade Payables | 0.06 |
| Other Current Liabilities | 2.98 |
| Short Term Provisions | 0 |
| Total Current Liabilities | 3.75 |
| Total Capital and Liabilities | 4.11 |
| Tangible Assets | 1.03 |
| Fixed Assets | 1.03 |
| Deferred Tax Assets [Net] | 2.69 |
| Long Term Loans and Advances | 0.1 |
| Other Non-Current Assets | 0 |
| Total Non-Current Assets | 3.82 |
| Inventories | 0.04 |
| Trade Receivables | 0.15 |

TABLE 5-continued

| | |
|---|---|
| Cash And Cash Equivalents | 0.01 |
| Short Term Loans and Advances | 0.08 |
| Total Current Assets | 0.29 |
| Total Assets | 4.11 |
| Contingent Liabilities | 0.2 |
| Equity Share Capital | 3.12 |
| Preference Share Capital | 4.25 |
| Total Share Capital | 7.37 |
| Reserves and Surplus | −7.36 |
| Total Reserves and Surplus | −7.36 |
| Total Shareholders' Funds | 0.01 |
| Long Term Borrowings | 0.35 |
| Long Term Provisions | 0 |
| Total Non-Current Liabilities | 0.35 |
| Short Term Borrowings | 0.7 |
| Trade Payables | 0.06 |
| Other Current Liabilities | 2.98 |
| Short Term Provisions | 0 |
| Total Current Liabilities | 3.75 |
| Total Capital and Liabilities | 4.11 |
| Tangible Assets | 1.03 |
| Fixed Assets | 1.03 |
| Deferred Tax Assets [Net] | 2.69 |
| Long Term Loans and Advances | 0.1 |
| Other Non-Current Assets | 0 |
| Total Non-Current Assets | 3.82 |
| Inventories | 0.04 |
| Trade Receivables | 0.15 |
| Cash And Cash Equivalents | 0.01 |
| Short Term Loans and Advances | 0.08 |
| Total Current Assets | 0.29 |
| Total Assets | 4.11 |
| Contingent Liabilities | 0.2 |

A set of 16116 sentences out of total 166935 sentences (9.6%) were predicted as adverse remark using the Ensemble method on the dataset D14 [D15. The system and method of the present disclosure had removed short sentences (e.g., sentences having length less than a pre-defined length (e.g., say sentences less than 'n' words (e.g., 5 words), where 'n' is the pre-defined length), noisy sentences (such as table rows), and duplicate sentences before applying the method. 113 and 127 sentences were labeled with XBRL categories Total Assets, Fixed Assets respectively. From these the system 100 selected the top 'k' adverse remarks about each category. Alternatively, user(s) can specify another text T, which the system 100 can map (or maps) to a suitable XBRL category $X_T$, which can be more general (ancestor) or more specific (descendant) than the above two. For example, if T=manufacturing plant buildings then $X_T$=Factory Building. Then, the system and method of the present disclosure identify adverse remarks which are labeled with $X_T$, select some of these and transform them (using simple linguistic rules for text transformation) as audit suggestions/recommendations. For example, the adverse remark sentence 'There was disposal of factory building during the year affecting the going concern of the company.' can be selected and transformed into an audit suggestion/recommendation as "Check if there was disposal of factory building".

Embodiments of the present disclosure provide systems and methods that apply natural language processing (NLP) techniques as known in the art on incoming corpus of financial audit reports, to extract hidden knowledge, and to use it for assisting auditors. Additionally, the system and method generate suitable audit suggestions/recommendations for auditors as additional focus points, apart from their standard operating procedures. The audit suggestions/recommendations are generated based on knowledge extracted from a large corpus of past audit reports of a plurality of entities (as mentioned above, for example, say many companies). This knowledge consists of a set of automatically identified sentences of type adverse remarks, the financial variables mentioned in each sentence and automatically assigned XBRL categories for them. The system and method of the present disclosure created (i) a set of high precision linguistic rules to identify adverse remark sentences, (ii) a labeled training data using them, and then trained a sentence classifier (e.g., $M_{BERT}$) to identify such sentences. The system and method further implemented several strategies to assign zero, one, or more XBRL categories (also referred as category tag) to any given adverse remark sentence. The method of the present disclosure has been evaluated against conventional baselines approaches. Given a company's suspicious financial statements, and a subset of financial variables in them that contribute to suspiciousness, the system and method of the present disclosure match these with the extracted knowledge base and identify aligned adverse remarks which can be utilized to generate audit suggestions/recommendations, to help the auditor in focusing on specific directions for further investigations.

The system 100 implements the sentence classifier with at least one attention layer (also referred as multi-headed attention layer) ($M_{BERT}$) which serves dual purpose—(i) assigning high attention weight to the tokens/words in sentence(s) which are more informative to determine whether the sentence is adverse or not. This results in a better overall sentence representation than the standard [CLS] representation given by BERT. (ii) Tokens/words with high attention weights serve as a kind of "explanation" of why the sentence is labelled as adverse_remark. This enables subject matter experts (SMEs) or domain experts to observe these attention weights for a few sentences and if any uninformative words from domain point of view are receiving high weights, then these words are added in stop words buckets and stored in the database 108. Attention weights are forced to zero for any such stop words by the system 100. This ensures that the $M_{BERT}$ does not learn any spurious words and focuses on informative words only thus resulting in better accuracy of identifying adverse remark-based sentence or labelling the sentences as applicable. Here, even though the current classification problem is binary (adverse_remark or not), the underlying sentence classifier is a multi-class multi-label. The attention layer is used for each distinct class label for each different head. Number of attention heads to be used is a hyperparameter, in one embodiment of the present disclosure. Further, the system 100 enables sentence representation obtained from 3 sources wherein the system 100 concatenate [CLS] embedding of a sentence, attention weighted average of token embeddings and a vector representing keywords information to obtain the overall sentence representation. This technique of concatenating 3 different sources of information to obtain the sentence representation addresses proper or appropriate keyword identifications. For instance, such identification can be done by the system 100 or also via one or more user inputs. For example, a domain expert/the system 100 can identify any keywords or key patterns (in terms of regular expressions) and a binary feature (presence or absence of each keyword/key pattern) is created for each keyword or key pattern for each sentence. A keyword information vector is thus formed by concatenating all such binary features. This vector eventually becomes part of the final sentence representation which helps in better identification of sentences and labelling them as whether these sentences contain adverse remark or not.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, via one or more hardware processors, a corpus of audit reports pertaining to one or more entities;
applying, a first set of rules via the one or more hardware processors, on a plurality of sentences comprised in the corpus of audit reports to obtain a set of relevant sentences;
labelling, by using a second set of rules via the one or more hardware processors, each sentence amongst the set of relevant sentences to obtain a set of labelled sentences, wherein each sentence in the set of labelled sentences is indicative of (i) an adverse remark-based sentence, (ii) a non-adverse remark-based sentence, and (iii) a sentence with no label;
identifying, by using a pre-trained sentence classifier having at least one attention layer via the one or more hardware processors, one or more adverse remarks with an associated explainability in one or more sentences having no label in the set of labelled sentences to obtain a set of adverse remark-based sentences, wherein the at least one attention layer is configured to generate the associated explainability for each of the one or more adverse remarks identified in the set of labelled sentences based on a high-attention weight assigned by the at least one attention layer;
applying, a windowing technique having a specific length via the one or more hardware processors, on each adverse remark-based sentence amongst the set of adverse remark-based sentences and performing a comparison of (i) an output of the windowing technique and (ii) a reference category having a pre-defined length to obtain at least one category tag for each adverse remark-based sentence amongst the set of adverse remark-based sentences;
generating, via the one or more hardware processors, a knowledge base based on the at least one category tag for each adverse remark-based sentence amongst the set of adverse remark-based sentences; and
automatically extracting the knowledge base of actionable knowledge elements from the corpus of past audit reports, wherein each knowledge element from the knowledge base of actionable knowledge elements consists of the tuple (S; v; $X_v$), where S is an adverse remark sentence, v is the text fragment in S which is a mention of a FV in S, $X_v$ is a set of XBRL categories corresponding to v.

2. The processor implemented method of claim 1, wherein the first set of rules comprise at least one of (i) filtering a sentence not having a verb in the corpus of audit reports, (ii) filtering a sentence having at least one of one or more tables, one or more rows, and one or more columns, and (iii) filtering a sentence having a length less than a pre-defined length.

3. The processor implemented method of claim 1, wherein the second set of rules comprise at least one of (i) one or more negative verbs without a negation, (ii) one or more positive verbs with the negation, (iii) one or more negative nouns without the negation, (iv) one or more positive nouns with the negation, (v) one or more negative adjectives without a negation, (vi) one or more positive adjectives with the negation, (vii) one or more opinion markers, and (viii) thwarting.

4. The processor implemented method of claim 1, wherein the comparison of (i) the output of the windowing technique and (ii) the reference category having the pre-defined length is further based on at least one of one or more morphological variations and one or more synonyms of one or more words in each adverse remark-based sentence amongst the set of adverse remark-based sentences.

5. The processor implemented method of claim 1, further comprising
obtaining, via the one or more hardware processors, one or more audit reports pertaining to at least one entity;
applying the pre-trained sentence classifier having the at least one attention layer on the one or more audit reports to obtain one or more adverse remark-based sentences in the one or more audit reports;
generating, via the one or more hardware processors, at least one associated category tag for each adverse remark-based sentence amongst the one or more adverse remark-based sentences in the one or more audit reports; and
generating, by using the generated knowledge base via the one or more hardware processors, one or more audit recommendations based on the at least one associated category tag for each adverse remark sentence amongst the one or more adverse remarks sentences.

6. The processor implemented method of claim 5, further comprising updating the generated knowledge base based on (i) the at least one associated category tag and the one or more associated adverse remarks for each adverse remark sentence amongst the one or more adverse remarks sentences, wherein the generated knowledge base is updated based on the at least one associated category tag and the one or more associated adverse remarks serving as (i) a new category tag entry, or (ii) a modification to an existing category tag entry in the generated knowledge base.

7. The processor implemented method of claim 1, further comprising:
receiving, via the one or more hardware processors, an input comprising a category tag; and
retrieving, via the one or more hardware processors, a ranked list of one or more adverse remark-based sentences stored in the generated knowledge base based on the category tag.

8. A system, comprising:
a memory storing instructions;
one or more communication interfaces; and
one or more hardware processors coupled to the memory via the one or more communication interfaces, wherein the one or more hardware processors are configured by the instructions to:
receive a corpus of audit reports pertaining to one or more entities;
apply a first set of rules on a plurality of sentences comprised in the corpus of audit reports to obtain a set of relevant sentences;
label, by using a second set of rules, each sentence amongst the set of relevant sentences to obtain a set of labelled sentences, wherein each sentence in the set of labelled sentences is indicative of (i) an adverse remark-based sentence, (ii) a non-adverse remark-based sentence, and (iii) a sentence with no label;
identify, by using a pre-trained sentence classifier having at least one attention layer via, one or more adverse remarks with an associated explainability in one or more sentences having no label in the set of labelled sentences to obtain a set of adverse remark-based sentences, wherein the at least one attention layer is configured to generate the associated explainability for each of the one or more adverse remarks identified in the set of labelled sentences based on a high-attention weight assigned by the at least one attention layer;
apply, a windowing technique having a specific length, on each adverse remark-based sentence amongst the set of adverse remark-based sentences and perform a comparison of (i) an output of the windowing technique and (ii) a reference category having a pre-defined length to obtain at least one category tag for each adverse remark-based sentence amongst the set of adverse remark-based sentences;
generate a knowledge base based on the at least one category tag for each adverse remark-based sentence amongst the set of adverse remark-based sentences; and
and
automatically extracting the knowledge base of actionable knowledge elements from the corpus of past audit reports, wherein each knowledge element from the knowledge base of actionable knowledge elements consists of the tuple (S; v; $X_v$), where S is an adverse remark sentence, v is the text fragment in S which is a mention of a FV in S, $X_v$ is a set of XBRL categories corresponding to v.

9. The system of claim 8, wherein the first set of rules comprise at least one of (i) filtering a sentence not having a verb in the corpus of audit reports, (ii) filtering a sentence having at least one of one or more tables, one or more rows, and one or more columns, and (iii) filtering a sentence having a length less than a pre-defined length.

10. The system of claim 8, wherein the second set of rules comprise at least one of (i) one or more negative verbs without a negation, (ii) one or more positive verbs with the negation, (iii) one or more negative nouns without the negation, (iv) one or more positive nouns with the negation, (v) one or more negative adjectives without a negation, (vi) one or more positive adjectives with the negation, (vii) one or more opinion markers, and (viii) thwarting.

11. The system of claim 8, wherein the comparison of (i) the output of the windowing technique and (ii) the reference category having the pre-defined length is further based on at least one of one or more morphological variations and one or more synonyms of one or more words in each adverse remark-based sentence amongst the set of adverse remark-based sentences.

12. The system of claim 8, wherein the one or more hardware processors are further configured by the instructions to:
  obtain one or more audit reports pertaining to at least one entity;
  apply the pre-trained sentence classifier having the at least one attention layer on the one or more audit reports to obtain one or more adverse remark-based sentences in the one or more audit reports;
  generate at least one associated category tag for each adverse remark-based sentence amongst the one or more adverse remark-based sentences in the one or more audit reports; and
  generate, by using the generated knowledge base, one or more audit recommendations based on the at least one associated category tag for each adverse remark sentence amongst the one or more adverse remarks sentences.

13. The system of claim 12, wherein the one or more hardware processors are further configured by the instructions to update the generated knowledge base based on (i) the at least one associated category tag and the one or more associated adverse remarks for each adverse remark sentence amongst the one or more adverse remarks sentences, and wherein the generated knowledge base is updated based on the at least one associated category tag and the one or more associated adverse remarks serving as (i) a new category tag entry, or (ii) a modification to an existing category tag entry in the generated knowledge base.

14. The system of claim 8, the one or more hardware processors are further configured by the instructions to:
  receive an input comprising a category tag; and
  retrieve a ranked list of one or more adverse remark-based sentences stored in the generated knowledge base based on the category tag.

15. One or more non-transitory machine-readable information storage mediums comprising one or more instructions which when executed by one or more hardware processors cause:
  receiving a corpus of audit reports pertaining to one or more entities;
  applying a first set of rules on a plurality of sentences comprised in the corpus of audit reports to obtain a set of relevant sentences;
  labelling, by using a second set of rules, each sentence amongst the set of relevant sentences to obtain a set of labelled sentences, wherein each sentence in the set of labelled sentences is indicative of (i) an adverse remark-based sentence, (ii) a non-adverse remark-based sentence, and (iii) a sentence with no label;
  identifying, by using a pre-trained sentence classifier having at least one attention layer, one or more adverse remarks with an associated explainability in one or more sentences having no label in the set of labelled sentences to obtain a set of adverse remark-based sentences, wherein the at least one attention layer is configured to generate the associated explainability for each of the one or more adverse remarks identified in the set of labelled sentences based on a high-attention weight assigned by the at least one attention layer;
  applying, a windowing technique having a specific length, on each adverse remark-based sentence amongst the set of adverse remark-based sentences and performing a comparison of (i) an output of the windowing technique and (ii) a reference category having a pre-defined length to obtain at least one category tag for each adverse remark-based sentence amongst the set of adverse remark-based sentences;
  generating a knowledge base based on the at least one category tag for each adverse remark-based sentence amongst the set of adverse remark-based sentences; and
  automatically extracting the knowledge base of actionable knowledge elements from a the corpus of past audit reports, wherein each knowledge element from the knowledge base of actionable knowledge elements consists of the tuple (S; v; $X_v$), where S is an adverse remark sentence, v is the text fragment in S which is a mention of a FV in S, $X_v$ is a set of XBRL categories corresponding to v.

16. The one or more non-transitory machine-readable information storage mediums of claim 15, wherein the first set of rules comprise at least one of (i) filtering a sentence not having a verb in the corpus of audit reports, (ii) filtering a sentence having at least one of one or more tables, one or more rows, and one or more columns, and (iii) filtering a sentence having a length less than a pre-defined length.

17. The one or more non-transitory machine-readable information storage mediums of claim 15, wherein the second set of rules comprise at least one of (i) one or more negative verbs without a negation, (ii) one or more positive verbs with the negation, (iii) one or more negative nouns without the negation, (iv) one or more positive nouns with the negation, (v) one or more negative adjectives without a negation, (vi) one or more positive adjectives with the negation, (vii) one or more opinion markers, and (viii) thwarting.

18. The one or more non-transitory machine-readable information storage mediums of claim 15, wherein the comparison of (i) the output of the windowing technique and (ii) the reference category having the pre-defined length is further based on at least one of one or more morphological variations and one or more synonyms of one or more words in each adverse remark-based sentence amongst the set of adverse remark-based sentences.

19. The one or more non-transitory machine-readable information storage mediums of claim 15, wherein the one or more instructions which when executed by the one or more hardware processors further cause:
  obtaining one or more audit reports pertaining to at least one entity;
  applying the pre-trained sentence classifier having the at least one attention layer on the one or more audit reports to obtain one or more adverse remark-based sentences in the one or more audit reports;
  generating at least one associated category tag for each adverse remark-based sentence amongst the one or more adverse remark-based sentences in the one or more audit reports;
  generating, by using the generated knowledge base, one or more audit recommendations based on the at least one associated category tag for each adverse remark sentence amongst the one or more adverse remarks sentences; and
  updating the generated knowledge base based on (i) the at least one associated category tag and the one or more associated adverse remarks for each adverse remark sentence amongst the one or more adverse remarks sentences, wherein the generated knowledge base is updated based on the at least one associated category tag and the one or more associated adverse remarks serving as (i) a new category tag entry, or (ii) a modification to an existing category tag entry in the generated knowledge base.

20. The one or more non-transitory machine-readable information storage mediums of claim 15, wherein the one or more instructions which when executed by the one or more hardware processors further cause:
  receiving an input comprising a category tag; and
  retrieving a ranked list of one or more adverse remark-based sentences stored in the generated knowledge base based on the category tag.

* * * * *